June 5, 1934.  J. J. OSPLACK  1,961,242
ANGLE TANGENT TO RADIUS DRESSER
Filed Sept. 23, 1932
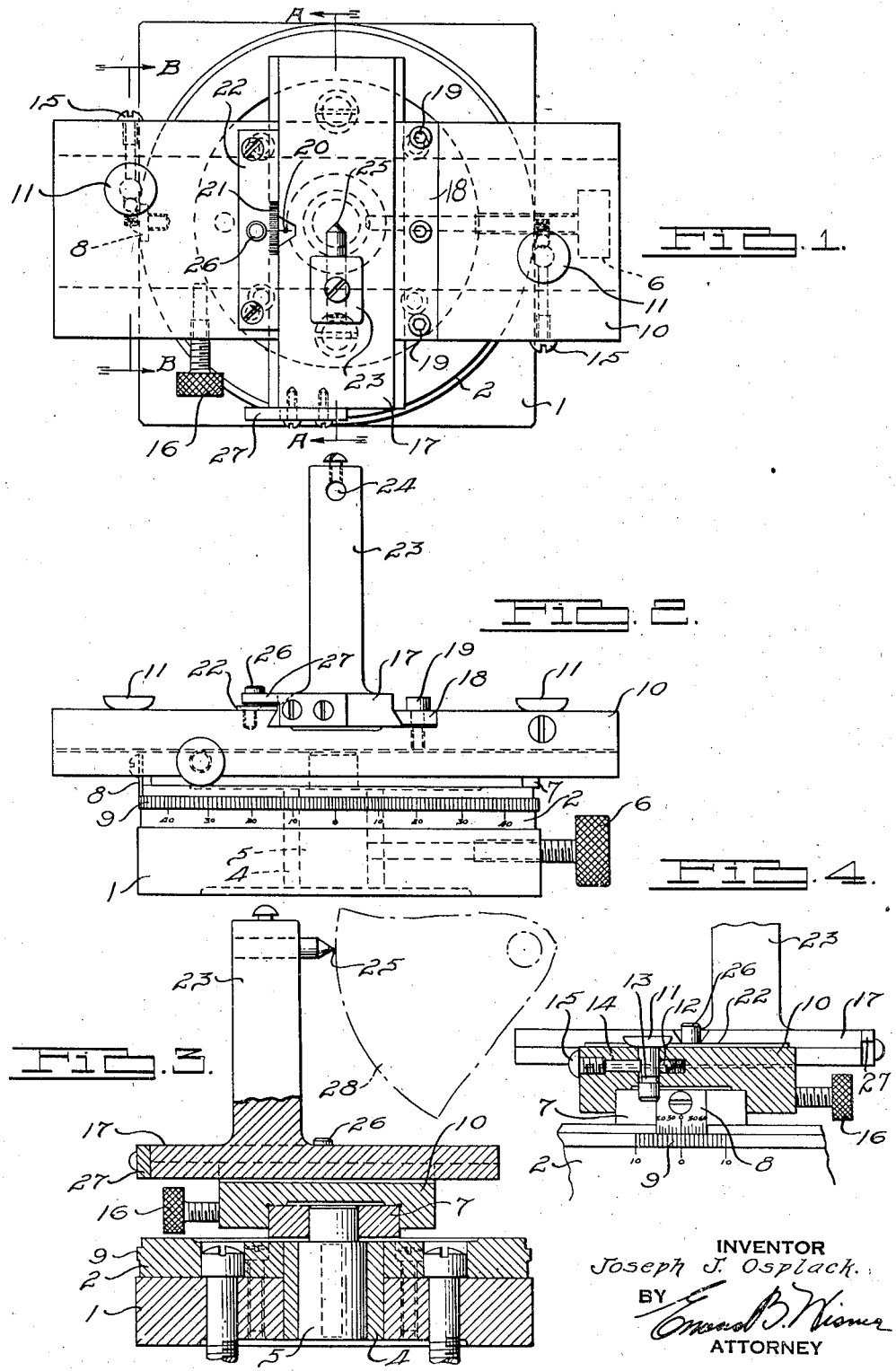
INVENTOR
Joseph J. Osplack.
BY
ATTORNEY Patented June 5, 1934

1,961,242

UNITED STATES PATENT OFFICE 1,961,242

ANGLE TANGENT TO RADIUS DRESSER

Joseph J. Osplack, Detroit, Mich.

Application September 23, 1932, Serial No. 634,477

4 Claims. (Cl. 125—11)

This invention relates to angle tangent to radius dressers and the important feature of the dresser is that it can be utilized to dress any angle tangent to a radius on abrasive wheels.

Another object of the invention is to provide a dresser particularly arranged for dressing abrasive wheels to a desired form or contour in which the angular faces of the wheels may be dressed to accurate width.

Another object of the invention is to provide a form dresser by means of which an abrasive wheel may be dressed to very accurate form and dimensions, the device being arranged so that Johannsen blocks or a micrometer may be utilized to accurately set the dressing diamond.

Another object of the invention is to provide a form dresser including a circular base calibrated in degrees and a slide turnable on the base to any degree, the slide being movable diametrically of the circular base and an additional slide being provided movable transversely of the first slide and carrying a diamond pointed tool by which the abrasive wheels are dressed.

These objects and the several novel features of the invention are hereinafter more fully described and claimed and the preferred form of construction by which these objects are attained is shown in the accompanying drawing in which—

Fig. 1 is a plan view of a form dresser embodying my invention.

Fig. 2 is an elevation thereof.

Fig. 3 is a section taken on line A—A of Fig. 1.

Fig. 4 is a section taken on line B—B of Fig. 1.

The device comprises a substantially rectangular base 1 having a cylindrical portion 2 which is accurately graduated in degrees as shown in Fig. 2. This base is provided with a central aperture, shown in Figs. 2 and 3, in which a bushing 4 is mounted and a vertical shaft 5 is rotatably mounted in this bushing. A set screw 6 is provided, as shown more particularly in Fig. 2, by which the shaft 5 may be bindingly secured at any position. A sine bar 7 is secured to the upper end of the shaft 5, as shown in Figs. 3 and 4, and this sine bar 7 is provided with a vernier index plate 8 secured to one end thereof which registers with the graduations 9 on the circular member 2 as will be understood from Figs. 2 and 4. These graduations are accurately arranged in degrees and extend about the circumference of the circular member 2. Slidably mounted on the sine bar 7 is a slide 10 and stop pins 11 are provided which may be pressed down to the position shown in Fig. 4 to engage the rounded ends of the sine bar 7 and prevent sliding movement of the slide 10.

When it is desired to move the slide 10 the stop pins 11 may be lifted upwardly with the fingers until the spring pressed ball 12 engages in the groove 13 provided in the respective stop pin. To prevent the stop pin 11 from turning, a key member 14 is provided riding in a key-way in the stop pin and this member 14 is held in position by the screw 15, as shown. When these stop pins 11 are lifted, the slide 10 may be moved to any desired position and may be secured at any setting on the sine bar 7 by means of the set screw 16. The slide 10 is provided with ways for the transverse diamond slide 17 as will be understood from Figs. 1 and 2. In order to adjust the slide 17, the member 18 which forms one of the ways is adjustable by means of the socket screws 19 which may be turned down to bindingly secure the member 17 in the slide member 10.

The slide 17 is adjustable transversely of the slide 10 and is provided with a zero indication 20 which registers with the graduations 21 on the scale bar 22 which is secured to the slide 10. Formed integrally with the slide 17 is a standard 23 and this standard carries the tool 24 which is provided with a diamond point 25. At the zero indication in the scale 22 is a pin 26 and a gage member 27 is fastened to the end of the slide 17 so that Johannsen blocks may be positioned between the pin 26 and the gage member 27 for accurately determining the position of the diamond 25 or a micrometer may be utilized for this purpose if desired. When the zero indication 20 on the slide 17 registers with the zero indication on the scale 22 the point of the diamond 25 is at the axis of the shaft 5 so that turning of the upper portion of the device on this shaft will not change the position of the diamond point 25. In order to dress a concave arc the slide 17 is moved to move the diamond 25 toward the top of Fig. 1 and to dress a convex arc, the slide 17 is moved to move the diamond toward the bottom of Fig. 1 and the radius is determined by the position of the zero indication 20 relative to the graduations 21 on the scale bar 22. This device may be used to grind both convex and concave wheel outlines and face angles and numerous combinations of radial and angular shapes otherwise difficult to obtain.

For instance, by raising the stop pin 11 at the left of Fig. 1 the slide 10 may be moved to the right of Fig. 1 and the device may be turned on the base to the desired angle. At this time, the slide may be moved to the left of Fig. 1 thus moving the diamond point 25 across the face of the grinding wheel 28 at the angle set and when the point 25 reaches the axis of the shaft 5 the stop pin 11 at the right of Fig. 1 will engage the end of the sine bar and stop the slide.

At this point the device may be turned on the base to another angle without changing the position of the point 25 and the stop 11 at the right of Fig. 1 may then be raised to allow the slide to be moved along at the newly set angle. However the device is particularly adapted for dressing angles tangent to a radius. For this purpose, the diamond is first set at the desired radius and the sine bar 7 is then turned to the desired angle at which time, the stop pin 11 at the left of Fig. 1 may be raised to allow the slide 10 to be moved to the right of Fig. 1 preparatory to dressing. At this time the slide may be moved again to the left of Fig. 1 across the face of the abrasive wheel and will dress the face to the desired angle until the stop pin 11 at the right of Fig. 1 engages the rounded end of the sine bar. At this time the point 25 will be at the radius desired to be dressed. The pin 11 at the left of Fig. 1 is then pressed down to lock the slide 10 on the sine bar and the sine bar is turned to the new angle to be dressed. As the sine bar is turned, the face of the abrasive wheel is dressed to the desired radius by the diamond and when the sine bar has been turned to the new angle the stop pin 11 at the right of Fig. 1 is raised allowing the slide 10 to be moved on the sine bar outwardly at the new angle. Thus both angles will be dressed tangent to the radius and as the device is very accurate, both angles and the radius will be accurate. This device will accurately dress forms which cannot be dressed with the ordinary radius dresser and provides a means for accurately dressing the face of an abrasive wheel to any desired combination of radiuses or angles.

From the foregoing description, it becomes evident that the device is very simple and efficient in operation, will not easily get out of order, is very accurate for the purpose and provides a device which accomplishes the objects described.

Having thus fully described my invention, its utility and mode of operation, what I claim and desire to secure by Letters Patent of the United States is—

1. In a form dresser, a base having a circular portion graduated in degrees, a sine bar rotatably mounted centrally of the circular portion, an index secured to one end of the sine bar and registering with the graduations on the base, a slide movable longitudinally of the sine bar, a second slide adjustable transversely of the first slide, a dressing tool carried by the second slide, index means for accurately adjusting the second slide transversely of the first slide and a stop pin mounted in each end of the first slide and arranged to be manually depressed, either stop-pin when so depressed being arranged to engage the circular graduated portion of the base during movement of the first slide and stop the dressing tool on a line intersecting the center of rotation of the sine bar.

2. In a form dresser, a base, a member rotatably mounted on the base, a slide slidably mounted on said member, a second slide movable transversely of the first slide, a dressing tool carried by the second slide, a pair of stop pins carried by one of the slides, either pin when moved to stopping position being arranged to stop the dressing tool on a line intersecting the center of rotation of the rotatable member on the base.

3. In a form dresser, a base, a member rotatably mounted on the base, a slide slidably mounted on said member, a second slide movable transversely of the first slide, a dressing tool carried by the second slide, manually operable stop means carried by one of the slides, the stop means when moved to stopping position being arranged to stop the dressing tool on a line intersecting the center of rotation of the rotatable member on the base.

4. In a form dresser, a base, a member rotatably mounted on the base, a slide slidably mounted on said member, a second slide movable transversely of the first slide, a dressing tool carried by the second slide, stop means carried by one of the slides, the stop means being movable into or out of stopping position and when moved to stopping position being arranged to stop the dressing tool on a line intersecting the center of rotation of the rotatable member on the base.

JOSEPH J. OSPLACK.